United States Patent [19]

Kagawa

[11] Patent Number: 5,189,666
[45] Date of Patent: Feb. 23, 1993

[54] BIT-SLICE ASYNCHRONOUS TRANSFER MODE SWITCHING SYSTEM

[75] Inventor: Manabu Kagawa, Tokyo, Japan

[73] Assignee: NEC Corporation, Tokyo, Japan

[21] Appl. No.: 645,990

[22] Filed: Jan. 24, 1991

[30] Foreign Application Priority Data

Jan. 25, 1990 [JP] Japan .................................. 2-16817

[51] Int. Cl.[5] .......................................... H04Q 11/04
[52] U.S. Cl. ...................................... 370/60; 370/94.1
[58] Field of Search ................ 370/60, 60.1, 91, 94.1, 370/54, 65

[56] References Cited

U.S. PATENT DOCUMENTS

| | | | |
|---|---|---|---|
| 4,598,400 | 7/1986 | Hillis | 370/94.1 |
| 4,947,388 | 8/1990 | Kuwahara et al. | 370/94.1 |
| 4,993,018 | 2/1991 | Hajikano et al. | 370/54 |
| 5,034,946 | 7/1991 | Smith | 370/60 |

Primary Examiner—Douglas W. Olms
Assistant Examiner—Shick Hom

[57] ABSTRACT

In an asynchronous transfer mode (ATM) switching system, an N-byte ATM cell containing a header and user data is received from a line circuit and an N-bit header containing routing information is derived from the received header. The received ATM cell is converted into a sequence of N parallel data bits and supplied to a first-stage controller to generate a first switching control signal. A successive bit of the N-bit header of the ATM cell is switched through a first-stage header-transfer switch in response to the first switching control signal and successive N parallel data bits of the cell are switched through a first-stage cell-transfer switch in response to the same control signal in synchronism with the first-stage header-transfer switch. A second-stage controller is responsive to the N-bit header switched from the first-stage header-transfer switch for generating a second switching control signal. A second-stage cell-transfer switch switches successive N parallel data bits of the ATM cell supplied from the first-stage cell-transfer switch in response to the second switching control signal. Successive N parallel data bits of the ATM cell supplied from the second-stage cell-transfer switch are converted to serial form for transmission to the next stage or switching system.

5 Claims, 6 Drawing Sheets

BIT-SLICE ASYNCHRONOUS TRANSFER MODE SWITCHING SYSTEM

BACKGROUND OF THE INVENTION

The present invention relates generally to switching systems, and more specifically to an asynchronous transfer mode (ATM) switching system.

According to the CCITT (International Telegraph and Telephone Consultative Committee) Recommendation specifying the format of 53-byte length cells for ATM switching systems, 48 bytes are assigned to the user information field and 5 bytes to the header field in which the virtual call identifier, priority and address information are contained. With the proposed ATM switching system using the Banyan self-routing network, each successive bit of the virtual call identifier is examined at each stage of the Banyan network to locate an output port of the stage. Since the Banyan network is made up of as many stages as there are bits in the virtual call identifier, the total amount of time taken to switch the cell through the network is substantial to implement high speed switching.

SUMMARY OF THE INVENTION

It is therefore an object of the present invention to provide an ATM switching system capable of operating at high speeds.

The object of the present invention is obtained by reducing the number of switching stages by switching ATM cells in a bit-slice mode.

According to the present invention, there is provided an asynchronous transfer mode (ATM) switching system which comprises a routing memory for storing routing information, a plurality of line circuits for serially receiving an ATM cell through transmission lines, accessing the routing memory to produce a routing signal in response to receipt of the ATM cell, dividing the ATM cell into a control segment and payload segments, and arranging the control segment and the payload segments in parallel form, the control segment containing the routing signal. A switching network is made up of a plurality of parallel switches which are arranged to form a plurality of sets of parallel input terminals and a plurality of sets of parallel output terminals, the input terminals of each set being connected in parallel to each of the line circuit to simultaneously receive the control segment and the payload segments, the output terminals of each set being connected in parallel to each of a plurality of destinations. A network controller is provided, which is responsive to a control segment from one of the line circuits for controlling the switching network so that the control segment and the payload segments are simultaneously transmitted through the parallel switches to one of the destinations.

BRIEF DESCRIPTION OF THE DRAWINGS

The present invention will be described in further detail with reference to the accompanying drawings, in which.

DETAILED DESCRIPTION OF THE INVENTION

Figure 1A:
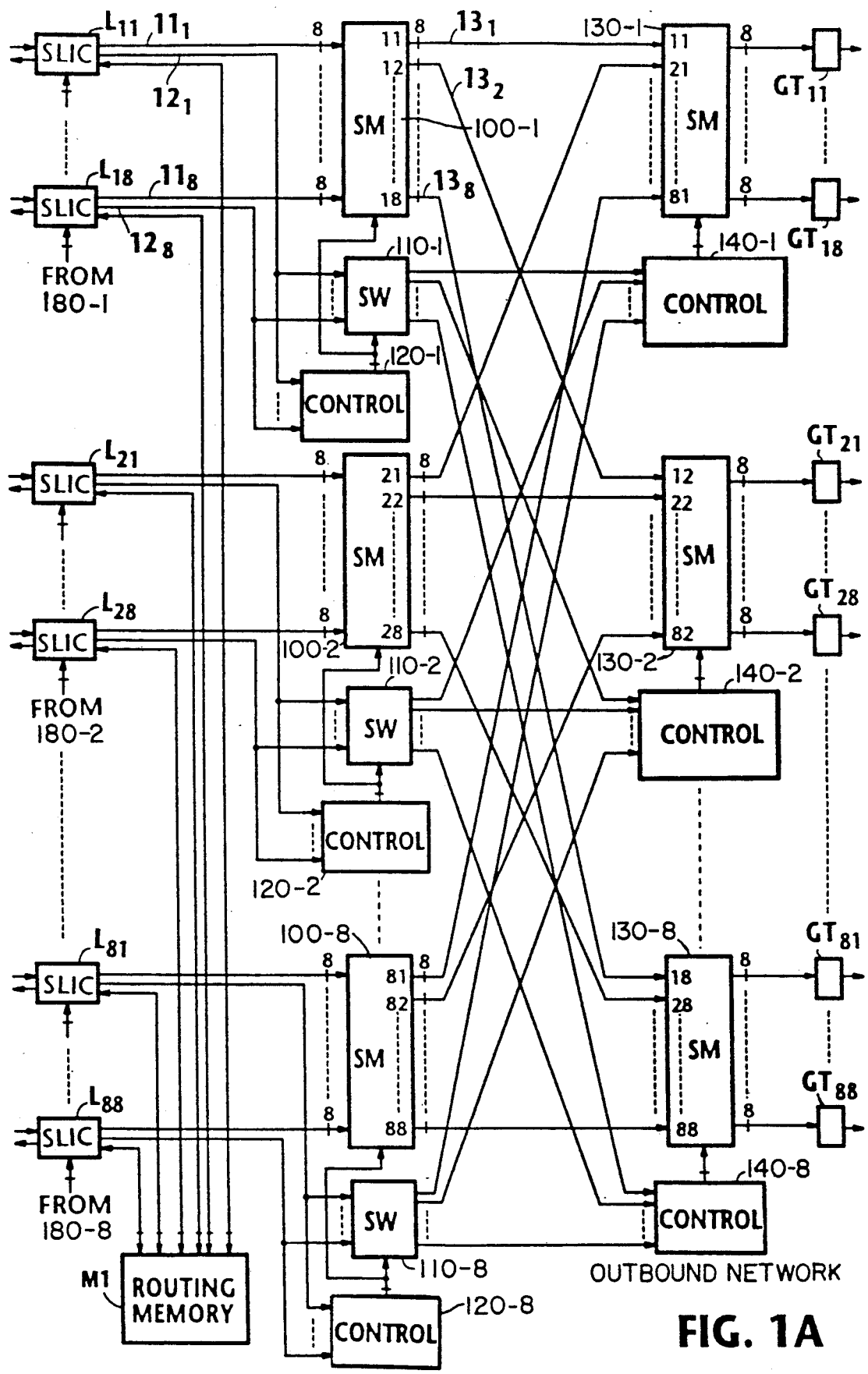
FIGS. 1A and 1B are block diagrams of the outbound and inbound networks of the ATM switching system of the present invention, respectively.
Figure 1B:
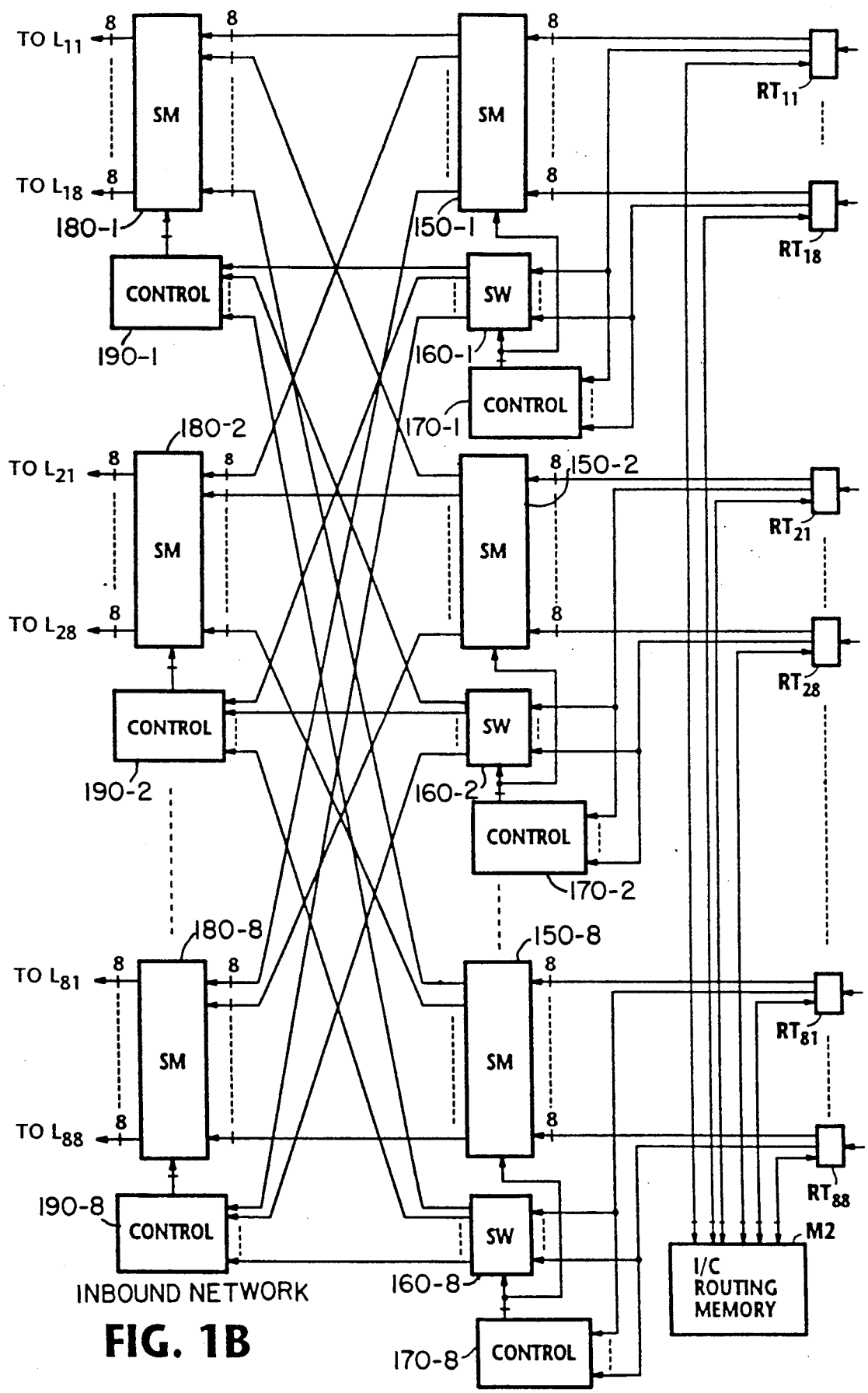

Referring now to FIGS. 1A and 1B, there is shown an ATM switching system of the present invention, respectively illustrating outbound and inbound switching networks for the "go" and "return" paths of full-duplex communications. In FIG. 1A, the ATM switching system comprises a plurality of subscriber line interface circuits (SLIC) $L_{11}$ to $L_{88}$, an outbound switching network of two-stage configuration, and a plurality of outbound trunk circuits $GT_{11}$ through $GT_{88}$ which are essentially parallel-to-serial converters. For purposes of disclosure, subscriber line interface circuits $L_{11}$ to $L_{88}$ are organized into eight groups of eight circuits each and outbound trunk circuits $GT_{11}$ to $GT_{88}$ are likewise organized into eight groups of eight circuits each. The first to eighth SLIC groups $L_{1i}$ (i=1 to 8) are associated with cell-transfer switching modules 100-1-100-8 respectively, which form the first stage of the outbound network. The first to eighth outbound trunk circuit groups $GT_{ij}$ (i=1 to 8, j=1 to 8) are associated with cell-transfer switching modules 130-1-130-8, respectively, which form the second stage of the outbound network.

The subscriber line interface circuits of each group are also associated with a respective one of header-transfer matrix switches 110-1-110-8 and a respective one of controllers 120-1-120-8.

Figure 2:
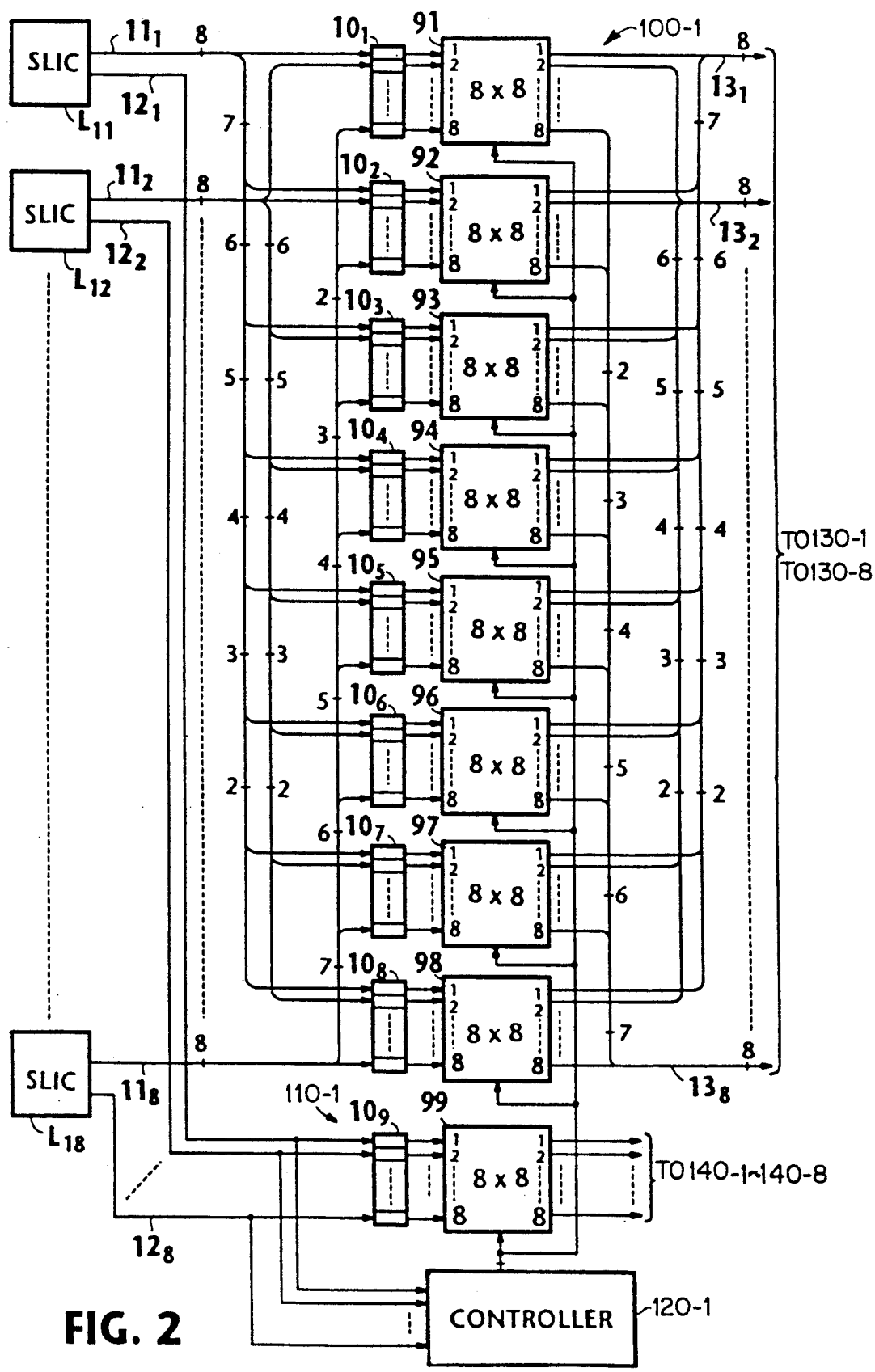
FIG. 2 is a block diagram showing details of a cell-transfer switching module and a header-transfer switch of FIG. 1A.

All switching modules of the outbound and inbound networks are of identical construction. As one example of the switching modules, details of the switching module 100-1 are shown in FIG. 2. This module comprises eight 8×8 LSI (large-scale integration) switches 91 through 98 of identical construction, each having one-bit wide input ports #1-#8 respectively associated with subscriber interfaces $L_{11}$ to $L_{18}$ via input buffers $10_1$-$10_8$. Subscriber line interface circuits $L_{11}$-$L_{18}$ respectively have 8-bit wide data buses $11_1$-$11_8$, the individual data lines of which are fanned out and respectively connected through buffers $10_1$-$10_8$ to the corresponding one bit wide input ports of 8×8 switches 91-98.

Header-transfer switch 110-$i$ is formed by an 8×8 LSI switch 99 and buffers $10_9$ respectively connected to the #1-#8 one-bit wide inputs of switch 99. Subscriber line interface circuits $L_{11}$-$L_{18}$ have control output lines $12_1$-$12_8$ leading to respective input ports of controller 120-1 and further connected via respective buffers $10_9$ to the #1-#8 input ports of switch 99. Each of the switches 91-98 has eight output ports #1-#8, these ports being bundled with the same-numbered output ports of the other seven switches to form 8-bit output ports (or links) $13_1$-$13_8$. Matrix switches 91-98 are all controlled by a common switching control signal supplied from the controller 120-1 for simultaneously switching eight data bits of an incoming ATM cell in a parallel, or "bit slice" mode to one of the 8-bit wide output ports $13_1$-$13_8$. Switch 99 is also controlled by the same switching signal for switching the header information bit to one of its output ports.

Returning to FIG. 1A, the 8-bit wide output ports #11, #12 . . . #18 of first-stage switching module 100-1 are connected to 8-bit wide input ports #11, #12 . . . #18 of the second-stage switching modules 130-1, 130-2, . . . 130-8, respectively. Likewise, the 8-bit wide output ports #21, #22 . . . #28 of switching module 100-2 are connected to 8-bit input ports #21, #22 . . . #28 of switching modules 130-1, 130-2, . . . 130-8, respectively, and the 8-bit output ports #81, #82 . . . #88 of switching module 100-8 are connected to input ports #81, #82 . . . #88 of switching modules 130-1, 130-2 . . . 130-8, respectively. Whereas, the output ports of each of the first-stage header-transfer switches 110-1-110-8 are connected to respective input ports of the second-stage controllers 140-1-140-8. The eight 8-bit output ports of switching modules 130-1 are respectively coupled to outbound trunk circuits $GT_{i1}$-$GT_{i8}$ (where $i=1$ to 8).

Figure 3:
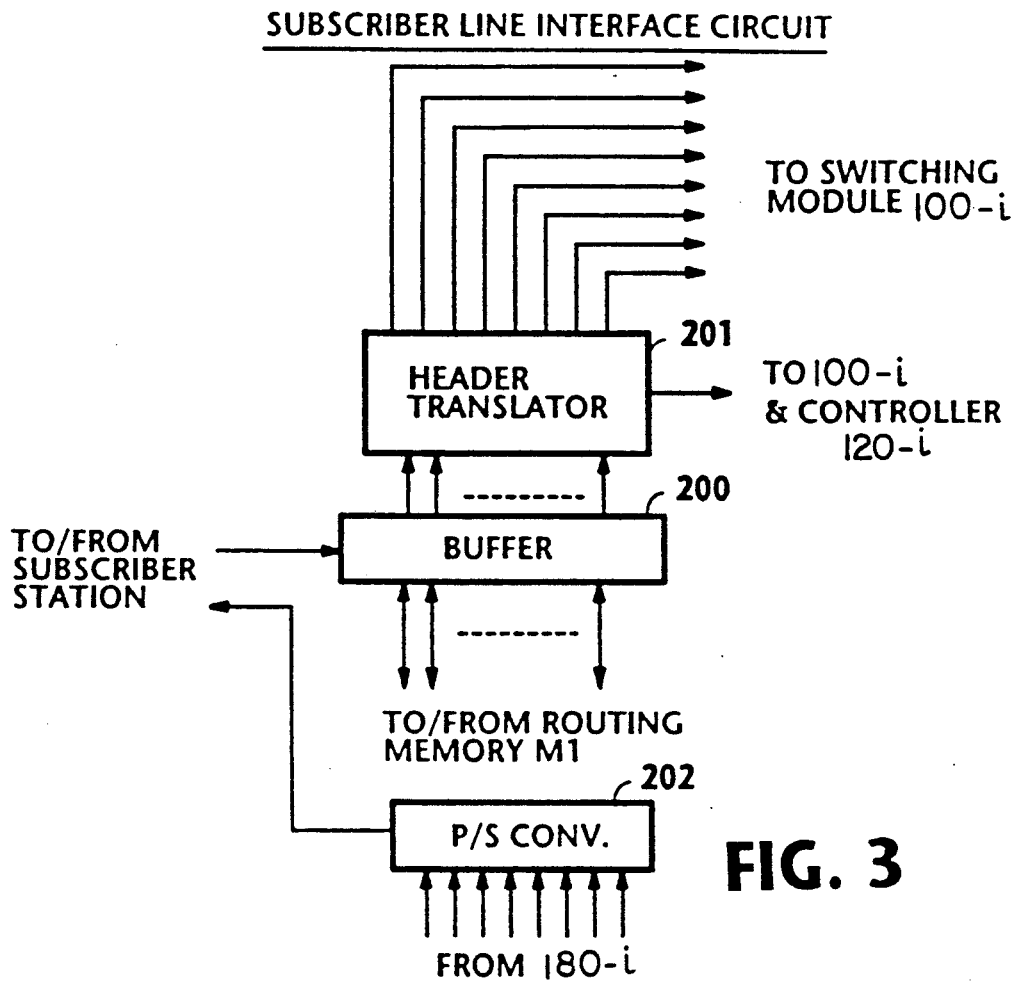
FIG. 3 is a block diagram showing details of each subscriber line interface circuit of FIG. 1A.

An incoming routing memory M1 is associated with all subscriber line interface circuits to receive a header supplied from a line circuit and returns to it a new virtual call identifier (or logical channel number identifying the call) and physical addresses identifying the output ports the first- and second-stage switching modules GM of the outbound network. As shown in FIG. 3, each subscriber line interface circuit comprises a buffer 200 to which ATM cells are supplied from associated subscriber station.

Each incoming cell contains a 5-byte of header information in which source and destination addresses and attributes of the cell are carried, and 48 byte of user information according to the CCITT Recommendation. The virtual call identifier contained in the received header is applied in parallel form to the routing memory M1. A new virtual call identifier and physical addresses are received from the memory M1 to form 53 bits of new header information which is supplied in serial form from the header translator 201 to the associated header-transfer switch $GS_{1i}$ as well as to controller 120-$i$. Header translator 201 rewrites the old virtual call identifier of the outbound ATM cell with the new one, and sends it in 8-bit parallel form to the associated switching module 100-$i$.

If a call is originated from SLIC $L_{11}$, controller 120-1 receives a 53-bit header therefrom and examines its first field in which the first physical address is contained. Knowing from the location of its input port to which the header is received, controller 120-1 supplies a switching control signal to the associated switching module 100-1 as well as to switch 110-1 to cause them to establish a data path from the 8-bit bus $11_1$ to a selected one of the 8-bit output ports of switching module 100-1 and a control path from the control line $12_1$ to one of the output ports of switch 110-1. Buffers $10_1$-$10_9$ introduce a delay time corresponding to the time taken to establish the paths in the switches 91-99 in order to avoid data corruption. Such buffers can be implemented as integral parts of the associated LSI matrix switches.

When a path is established in the switch 99, the header information is supplied from the buffer $10_9$ and switched over the established path to controller 140-2, for example. Concurrent with the transfer of each bit of the 53-bit header information from 110-1 to controller 140-2, every eight bits of the 53-byte ATM outbound cell are supplied over data bus $11_1$ and transferred from switching module 100-1 to switching module 130-2 through output port $13_2$.

In response to the 53-bit cell header from the first outbound stage, the controller 140-2 controls its associated switching module 130-2 by examining the second field of the header in which the second physical address is contained. Therefore, a data path is established in switching module 130-2 from its #12 input port to one of its output ports which leads to outbound trunk circuit $GT_{28}$, for example. Trunk circuit $GT_{28}$ converts successive 8-bit parallel data bits of the cell switched from module 130-2 into serial form for transmission to the next switching exchange.

Referring to FIG. 1B, the inbound network of the ATM switching system of this invention comprises inbound trunk circuit $RT_{11}$-$RT_{88}$, and an inbound switching network of two-stage configuration comprising cell-transfer switching modules 150-1-150-8 which comprise the first stage of the inbound network and cell-transfer switching modules 180-1-180-8 comprising the second stage of the inbound network, each switching module being identical in construction to those of the outbound network. The first stage of the inbound network further includes header-transfer switches 160-1-160-8 and controllers 170-1-170-8, and the second stage further includes controllers 190-1-190-8. Each header-transfer switch RS is identical in construction to those of the outbound network. Inbound trunk circuits $RT_{11}$-$RT_{88}$ are divided into eight groups associated respectively with switching modules 150-1-150-8.

Figure 4:
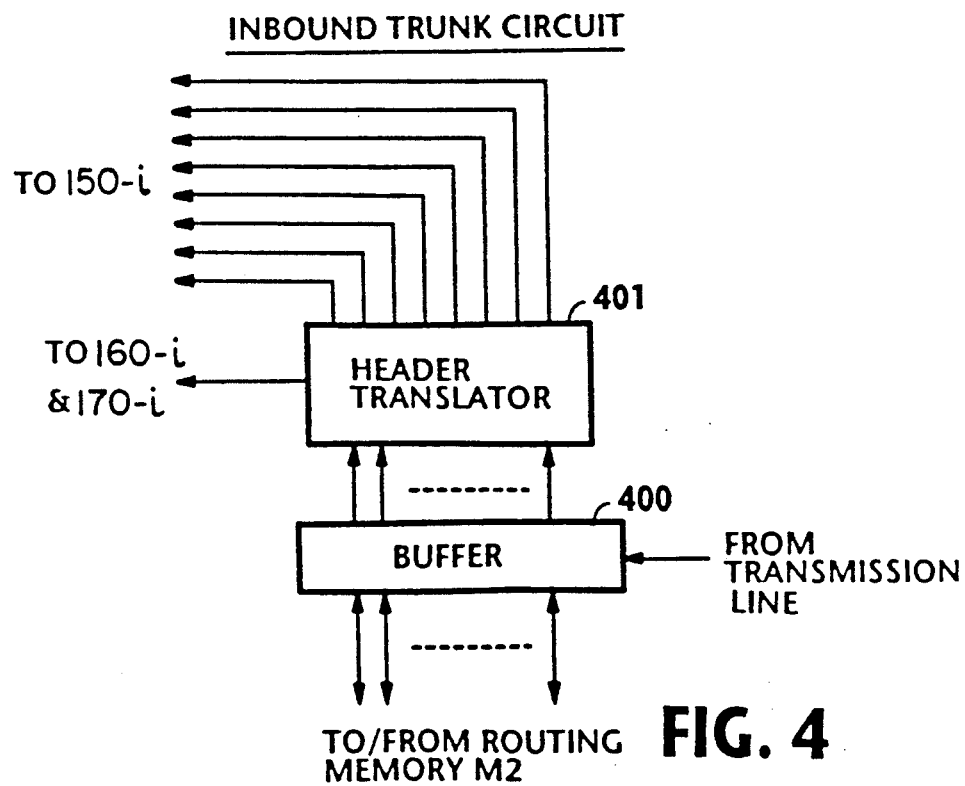
FIG. 4 is a block diagram showing details of each inbound trunk circuit of FIG. 1B.

As shown in FIG. 4, each inbound trunk circuit RT comprises a buffer 400 and a header translator 401. An inbound cell from a distant station, containing a 53-bit header and 53-byte user information, is fed into buffer 400. The header is applied in parallel form to an incoming routing memory M2 and to header translator 401. On receiving it, incoming routing memory M2 returns to buffer 400 a virtual call identifier and first and second physical addresses respectively identifying the output ports the first- and second-stage switching modules 150 and 180 of the inbound network in a manner similar to that of the outbound network. The returned information is applied to header translator 401 to rewrite the header information. A 53-bit header is generated in a manner similar to the line circuits and applied in serial form from header translator 401 to the associated controller 170-1 and switch 160-1, while the 53-byte user information is applied in 8-bit parallel form to the associated input port of the associated switching module 150-$i$. Second-stage switching modules 180-1-180-8 are associated with the respective groups of SLICs and each module has 8-bit output ports respectively leading to SLICs $L_{i1}$-$L_{i8}$ of the group with which it is associated.

On receiving a cell header from inbound trunk circuit $RT_{21}$, for example, the controller 170-2 examines its first field containing the first physical address of the header identifying the output port of 150-2 which extends to switching module 180-1. Knowing from its input port to which the header is applied, controller 170-2 supplies a signal to the associated switching module 150-2 as well as to switch 160-2 to establish a data path to one of the 8-bit output of switching module 150-2 and a control path to one of the output ports of switch 160-2. When the control path is established in switch 160-2, the header information is switched to second-stage controller 190-1. Concurrent with the transfer of each bit of the 53-bit inbound header information through 160-1 to controller 190-1, every eight bits of the 53-byte ATM inbound cell data are switched from switching module 150-1 to module 180-1. In response to this 53-bit cell header, controller 190-1 controls its associated switching module 180-1 by examining its second field which contains the second physical address of the inbound cell identifying the output port leading to the call-originating SLIC $L_{11}$. Therefore, a data path is established in switching module 180-1 to SLIC $L_{11}$ and 8-bit ATM cell data are passed to the parallel-to-serial converter 203 of SLIC $L_{11}$ in which it is converted to serial form and transmitted via hybrid 200 to the calling subscriber station.

Figure 5:
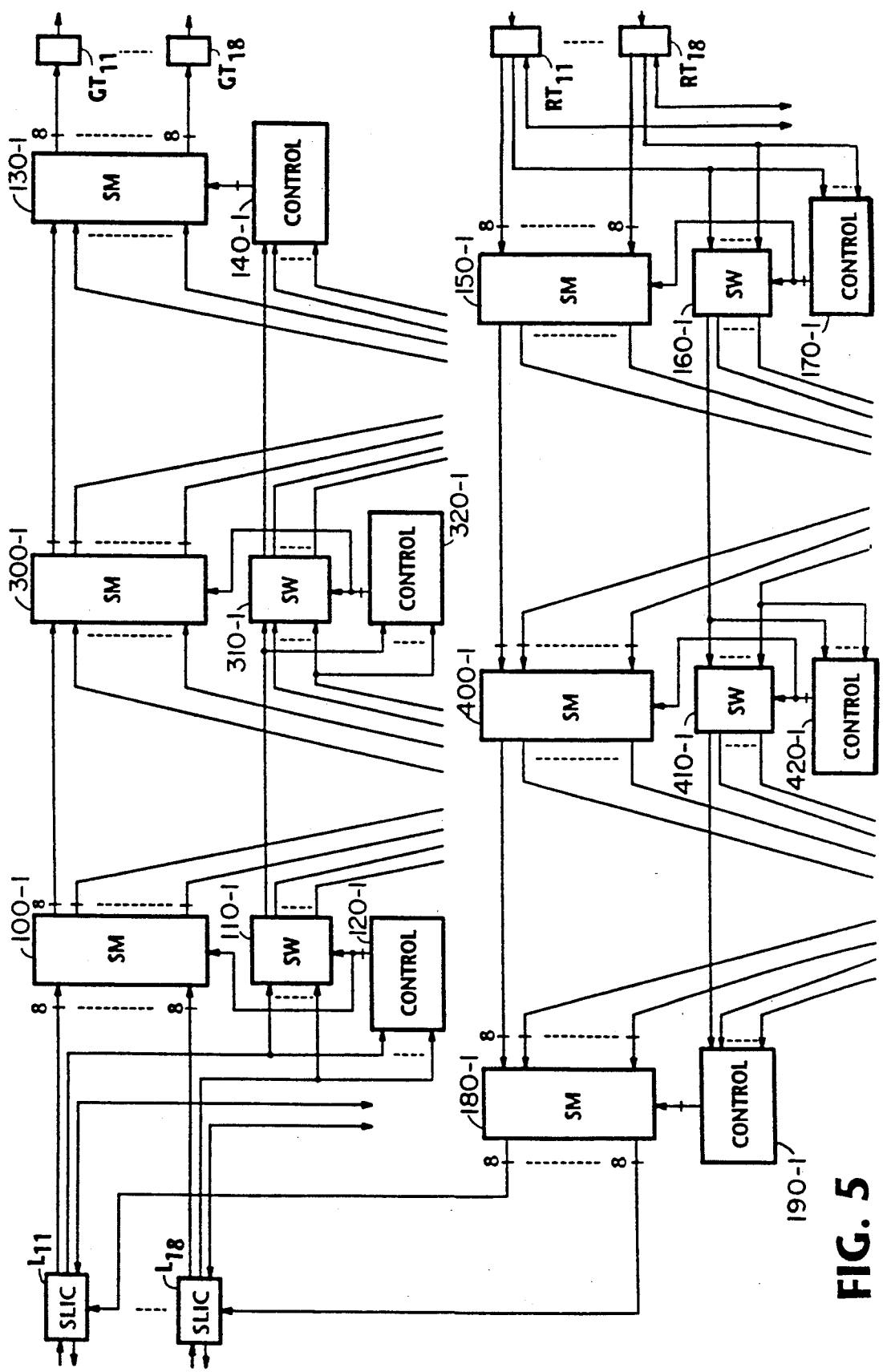
FIG. 5 is a block diagram of a three-stage ATM switching system of the present invention.
Figure 6:
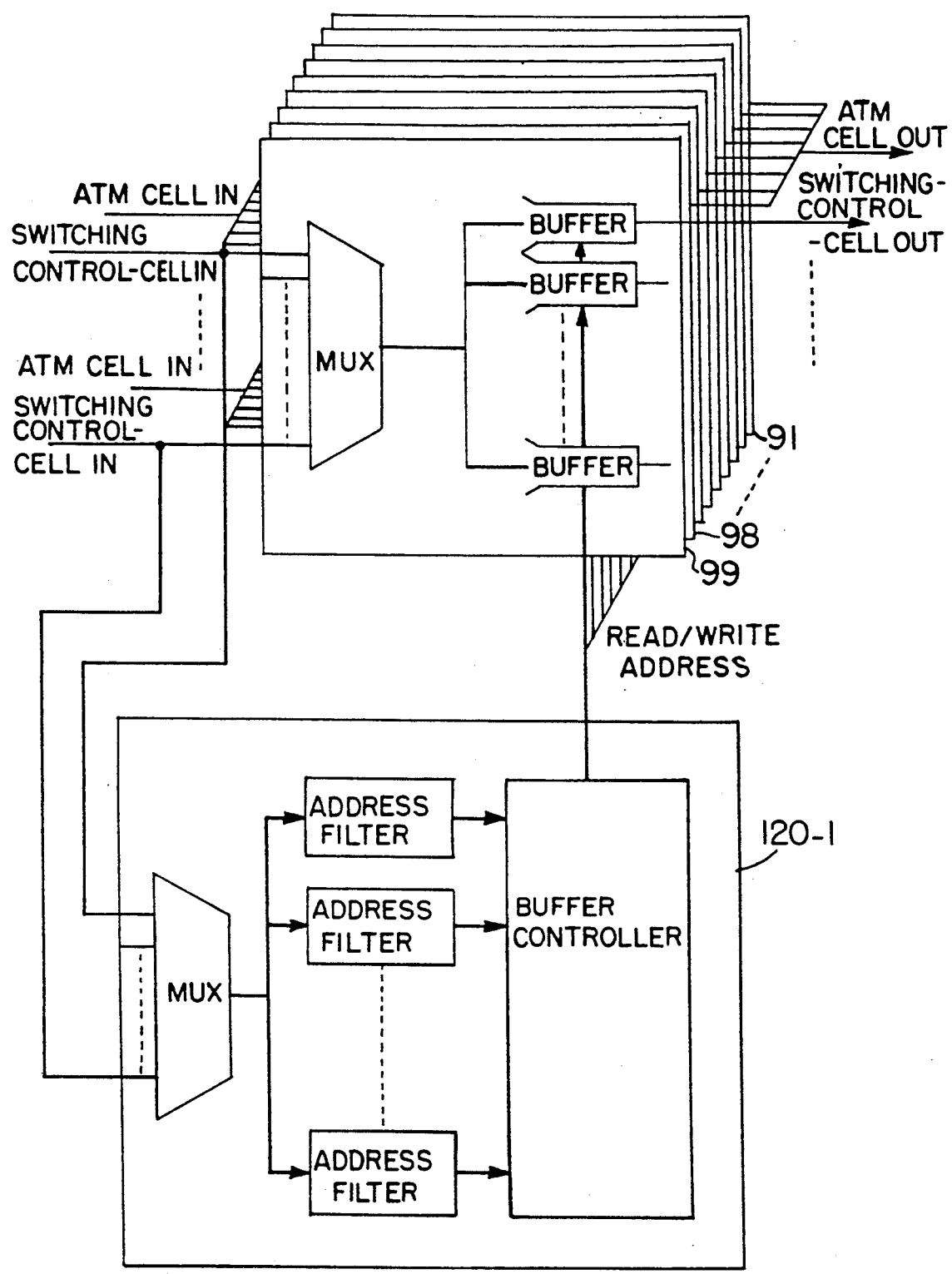

The two-stage ATM switching system of this invention can be expanded to a three-stage configuration as shown in FIG. 5 by installing an outbound intermediate stage similar in configuration to the first outbound stage and an inbound intermediate stage similar to the first inbound stage. It is seen that the last stage of each outbound and inbound network comprises a cell-transfer switching module and a controller, while the other stages additionally comprise a header-transfer switch for relaying the header to the next stage.

Since the 53-byte ATM cell data are switched in eight-bit parallel mode, the total amount of time taken to read the contents of a header at successive stages can be reduced significantly and each ATM cell can be switched at a speed much higher than that attainable with the proposed Banyan networks. Furthermore, the separation of the speech and control paths of the switching system into independent units simplifies the amount of work involved with the addition of new service features since it only requires alterations in the control path. This enhances the flexibility of the system to varying needs of customers.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An asynchronous transfer mode (ATM) switching system comprising:
    a routing memory for storing routing information;
    a plurality of line circuit means for serially receiving an ATM cell through transmission lines, accessing said routing memory to produce a routing signal in response to receipt of said ATM cell, dividing the ATM cell into a control segment and payload segments, and arranging the control segment and the payload segments in parallel form, said control segment containing said routing signal;
    a switching network comprising a plurality of parallel switches arranged to form a plurality of sets of parallel input terminals and a plurality of sets of parallel output terminals, the input terminals of each set being connected in parallel to each of said line circuit means to simultaneously receive said control segment and said payload segments, the output terminals of each set being connected in parallel to each of a plurality of destinations; and
    network control means responsive to the control segment for controlling the switching network so that said control segment and said payload segments are simultaneously transmitted through said parallel switches to one of said destinations.

2. An asynchronous transfer mode switching system as claimed in claim 1, wherein said ATM cell is an N-byte cell and said control segment and said payload segments being arranged into a series of N sets of eight parallel bits, one of said parallel bits forming part of said control segment and the remainder forming part of said payload segments.

3. An asynchronous transfer mode switching system as claimed in claim 2, wherein each of said parallel switches has eight input terminals and eight output terminals.

4. An asynchronous transfer mode (ATM) switching system comprising:
    a routing memory for storing routing information;
    a plurality of line circuit means for serially receiving an ATM cell through transmission lines, accessing said routing memory to produce a routing signal in response to receipt of said ATM cell, dividing the ATM cell into a control segment and payload segments, and arranging the control segment and the payload segments in parallel form, said control segment containing said routing signal;
    an input-stage switching network comprising a plurality of first parallel switches having a plurality of sets of input terminals and a plurality of sets of output terminals, the input terminals of each set being connected in parallel to each of said line circuit means to simultaneously receive said control segment and said payload segments;
    an input controller responsive to a control segment from one of said line circuit means for controlling the first parallel switches so that said control segment and associated payload segments are simultaneously transmitted through said first parallel switches to one of the sets of said output terminals;
    an output-stage switching network comprising a plurality of second parallel switches having a plurality of sets of input terminals and a plurality of sets of output terminals, the input terminals of each set of the second parallel switches being connected to one of the sets of the output terminals of the input-stage switching network, the output terminals of each set of the second parallel switches being connected in parallel to each of a plurality of trunk circuits; and
    an output controller responsive to the control segment received in said input-stage switching network for controlling the output-stage switching network so that said payload segments are simultaneously transmitted through said second parallel switches to one of said trunk circuits.

5. An asynchronous transfer mode (ATM) switching system comprising:
    a routing memory for storing routing information;
    a plurality of line circuit means for serially receiving an ATM cell through transmission lines, accessing said routing memory to produce a routing signal in response to receipt of said ATM cell, dividing the ATM cell into a control segment and payload segments, and arranging the control segment and the payload segments in parallel form, said control segment containing said routing signal;
    an input stage comprising a plurality of identical switching modules, each of said modules having a plurality of sets of input terminals and a plurality of sets of output terminals, the input terminals of each set being connected to each of said line circuit means;
    a plurality of input controllers associated respectively with the switching modules of the input stage, each of the input controllers being responsive to a control segment from one of said line circuit means for controlling an associated switching module so that said control segment and associated payload segments are simultaneously transmitted through the associated switching module to one of the sets of said output terminals of the associated switching module;

an output stage comprising a plurality of identical switching modules, each of said modules having a plurality of sets of input terminals and a plurality of sets of output terminals, the input terminals of each set being connected to the output terminals, the input terminals of each set being connected to the output terminals of one of the sets of the input stage, and the output terminals of each set being connected to each of a plurality of trunk circuits; and a plurality of output controllers associated respectively with the switching modules of the output stage, each of the output controllers being responsive to the control segment from said input stage for controlling the associated switching module so that said associated payload segments are simultaneously transmitted through the associated switching module to one of the trunk circuits.

* * * * *